Figure 1:
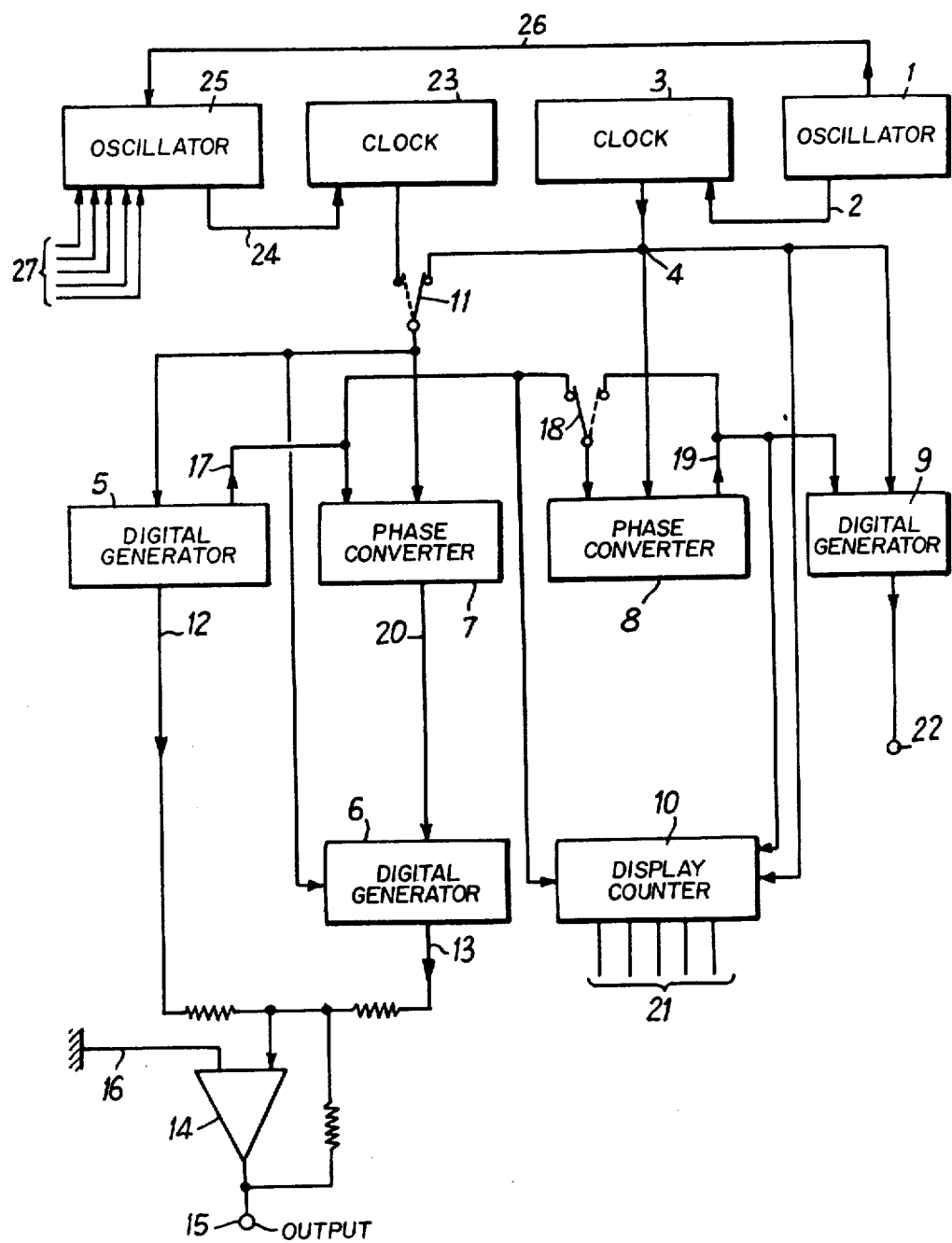

United States Patent [19]

Gouley

[11] 4,207,570

[45] Jun. 10, 1980

[54] DEVICE FOR SIMULATING BEARING SIGNALS OF THE TACAN TYPE

[75] Inventor: Claude A. Gouley, Cugnaux, France

[73] Assignee: Societe Nationale Industrielle Aerospatiale, Paris, France

[21] Appl. No.: 923,931

[22] Filed: Jul. 13, 1978

[30] Foreign Application Priority Data

Jul. 20, 1977 [FR] France .................. 77 22211

[51] Int. Cl.² .............................................. G01S 7/40
[52] U.S. Cl. ...............................343/106 R; 343/17.7
[58] Field of Search ........................... 343/17.7, 106 R

[56] References Cited

U.S. PATENT DOCUMENTS

| 2,912,688 | 11/1959 | Faymoreau et al. | 343/106 R |
| 3,172,107 | 3/1965 | Morris | 343/17.7 X |
| 3,312,972 | 4/1967 | Alitz | 343/17.7 X |
| 3,845,484 | 10/1974 | Sawicki et al. | 343/106 R |
| 4,104,637 | 8/1978 | Nielson | 343/106 R |

Primary Examiner—T. H. Tubbesing

[57] ABSTRACT

The invention relates to a device for simulating bearing signals of the TACAN type, formed by a modulation signal carried by a high frequency signal and resulting from the superposition of two sinusoidal signals of different low frequencies, as well as by spaced apart reference pulse trains, synchronized at emission with said modulation signal and representative of a determined orientation. According to the invention, this device is characterized in that it comprises, on the one hand, at least three signal generators of totally digital design, two of these generators being respectively provided to produce the equivalents of two sinusoidal modulation signals, while the third is intended to produce the equivalents of said reference pulse trains and, on the other hand, a quartz oscillator entirely controlling the functioning of said device and, in particular, that of the three digital generators. The invention is applied to the simulation of a TACAN beacon for testing airborne instruments in an aircraft.

7 Claims, 4 Drawing Figures

# DEVICE FOR SIMULATING BEARING SIGNALS OF THE TACAN TYPE The present invention relates to a device for simulating bearing signals emitted by a TACAN locating beacon of known type (Tactical Air Navigation). Such a device is intended for testing airborne apparatus on board an aircraft for example, adapted to receive and exploit the signals from a TACAN beacon to determine the bearing of said aircraft with respect to said beacon.

With a view to determining the bearing of an aircraft, a TACAN beacon is known to comprise a rotary antenna of which the radiation pattern is similar to a cardioid, emitting on the one hand a high frequency signal carrying a modulation signal formed by the superposition of a sinusoid at 135 Hz and of a sinusoid at 15 Hz, and on the other hand primary and secondary reference pulse trains synchronised at emission with said modulation signal. The primary reference pulse trains are emitted each time that the point of the cardioid passes, during the rotation of the antenna, in the east position, whilst the secondary reference pulse trains are distributed every 40° from a primary reference pulse train. Thus, at a given instant, counted from the primary reference pulse train, the phase of the modulation signal received by an aircraft depends on the bearing of said aircraft. From this phase (and from the corresponding ones of the sinusoids at 15 Hz and 135 Hz), the airborne TACAN receiving instruments calculate said bearing.

It is therefore easily imagined that it is particularly important that the airborne apparatus are tested and adjusted with a strict precision in phase and in frequency.

It is an object of the present invention to provide a device for simulating TACAN bearing signals allowing such a test and such an adjustment, as it offers, due to its structure and without adjustment, a strict precision of phase and frequency.

To this end, according to the invention, the device for simulating bearing signals of the TACAN type, formed by a modulation signal carried by a high frequency signal and resulting from the superposition of two sinusoidal signals of different low frequencies, as well as by spaced apart pulse trains, synchronised, at emission, with said modulation signal and representative of a determined orientation, is noteworthy in that it comprises, on the one hand, at least three signal generators of totally digital design, two of these generators being respectively provided to produce the equivalents of the two sinusoidal modulation signals, whilst the third is intended to produce the equivalents of said pulse trains and, on the other hand, a quartz oscillator entirely controlling its functioning and, in particular, that of the three digital generators.

In an advantageous embodiment, said quartz oscillator controls a first fixed clock which, in its turn, controls in parallel a first digital generator intended to produce the sinusoidal signal of higher frequency, a second digital generator intended to produce the sinusoidal signal of lower frequency, a first digital counter with programmable counting value, a digital counter-displayer and a third digital generator intended to produce said reference pulse trains, said first generator being, moreover, adapted to deliver to said second generator, to said first counter and to said counter-displayer, a pulse representative of passage to 0 degree of phase of sinusoidal signal at higher frequency, whilst the first digital counter is capable of transmitting to the counter-displayer and to the third generator, said representative pulse with a delay corresponding to a programmed counting value.

Thus, each value of this delay corresponds to a possible bearing for a supposed mobile body, the value of which bearing may then be displayed on the counter-displayer, since said latter, controlled by said first fixed clock, receives on the one hand the pulse representative of passage to 0 degree of phase of the sinusoidal signal at the higher frequency and on the other hand the corresponding delayed pulse. Similarly, the third generator controlled by this delayed pulse and by the fixed clock furnishes reference pulse trains whose "phase shift" with respect to the sinusoidal signal of the first generator is representative of a possible bearing for a supposed mobile body. Finally, to obtain the analog modulation signal, it is possible to provide digital/analog converters, for example, multipliers. At the connected outputs of these converters, the modulation signal is therefore obtained.

In order to be able to simulate a deformation of the lobes of the radiation diagram of the antenna of the simulated TACAN beacon, it is advantageous to provide, between the first and the second sinusoidal signal generator, a second digital counter with programmable counting value intended to transmit with delay to said second generator said pulse representative of the passage to 0 degree of phase of the sinusoidal signal at the higher frequency, said second counter also being controlled by said first fixed clock.

Moreover, in order to simulate the effect of the speed of a mobile body with respect to a TACAN beacon, it is advantageous if said quartz oscillator controls a second variable clock disposed in parallel with the fixed clock and capable of controlling, in its turn, via a position of a first switching member of which the other position connects to the first fixed clock said first digital generator, said second digital generator and the second digital counter, whilst a second switching member is provided so that one of its positions connects said first generator and said first counter, the other of the positions of said second switching member looping said first counter on itself.

When at least one of said first and second digital generators is intended to produce a sinusoidal signal of frequency f, by means of the synthesis of N points per period, the device is preferably noteworthy in that this digital generator comprises a first forward-backward counter receiving from a clock a signal of frequency at least approximately equal to N.f and transmitting its state to a memory in which to each of these states there corresponds a logic level 1 or 0 according to whether or not it is necessary to increment the preceding totalised value to follow as accurately as possible the function to be synthesized, a second forward-backward counter totalizer receiving this logic level 1 or 0 and a logic controlling said first and second forward-backward counters for forward counting or backward counting. In this case, the first forward-backward counter alternately counts the first N/4 clock pulses, and counts down the following N/4 clock pulses, whilst, in a cycle of N clock pulses, the second forward-backward counter counts during the first N/4 clock pulses, counts down during the following 2.N/4 clock pulses, and counts forward again during the N/4 clock pulses following these 2.N/4 pulses. The increment by which the preceding totalised value must or must not be increased is advantageously constituted by said logic level 1 or 0.

It is advantageous if the third digital generator comprises a trigger and two generation counters, said trigger receiving its orders from the first digital counter with programmable counting value and controlling respectively said generation counters so that they each emit reference pulse trains respectively representative of the primary and secondary reference pulse trains of the TACAN system.

When the digital/analog converters furnish voltage signals, the outputs of said first and second generators are connected to the same input of an operational amplifier mounted as a voltage/current converter.

The invention will be more readily understood on reading the following description with reference to the accompanying drawings, in which:

FIG. 1 is the block diagram of a simulating device according to the invention.

Figure 2:
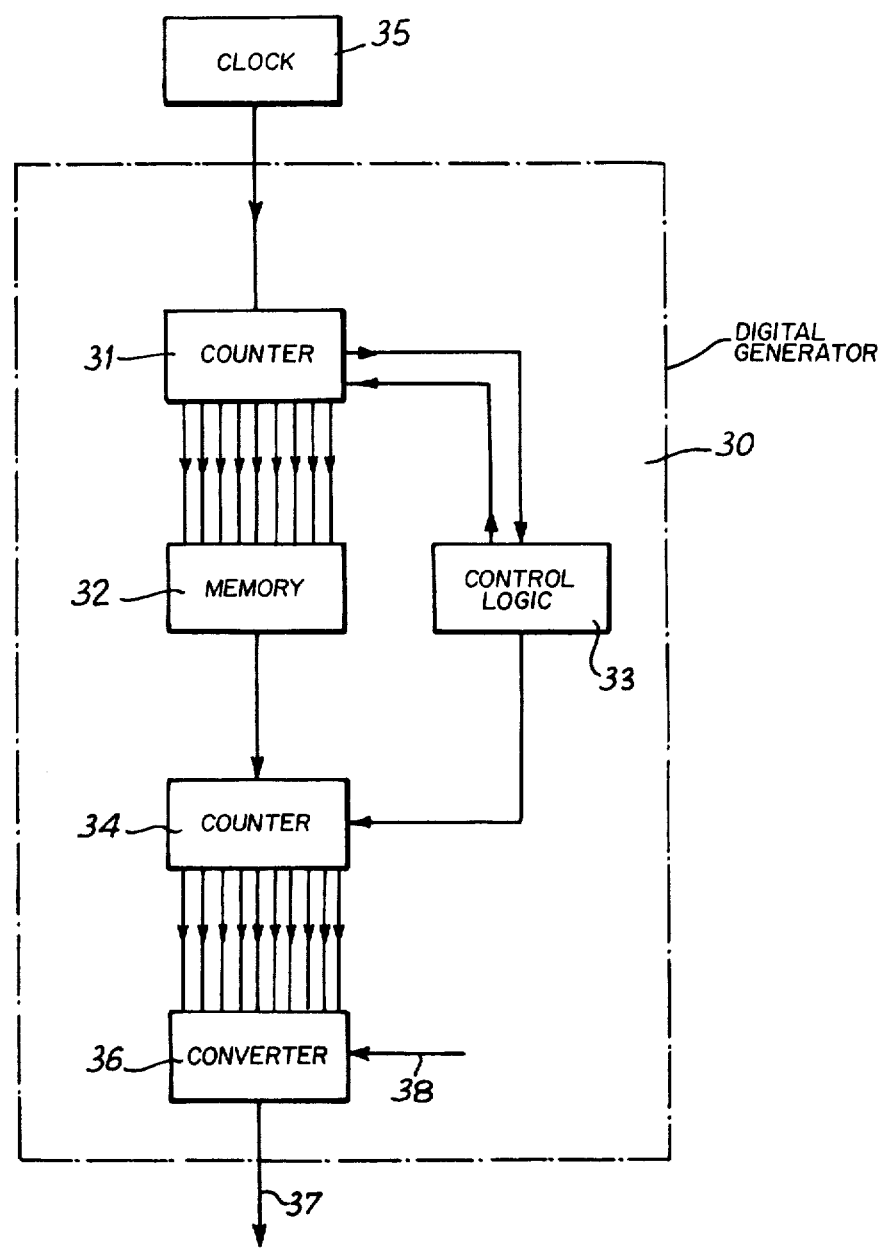

FIG. 2 schematically shows a function generator for the device of FIG. 1.

Figure 3:
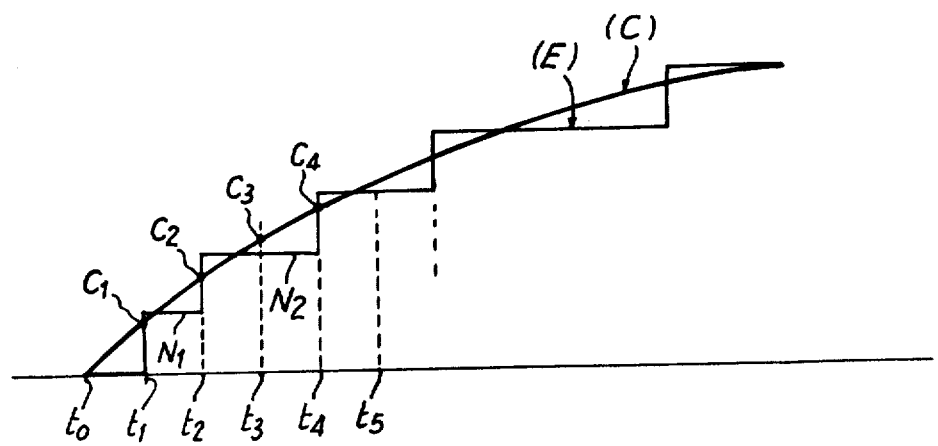

FIG. 3 illustrates the functioning of the generator of FIG. 2.

Figure 4:
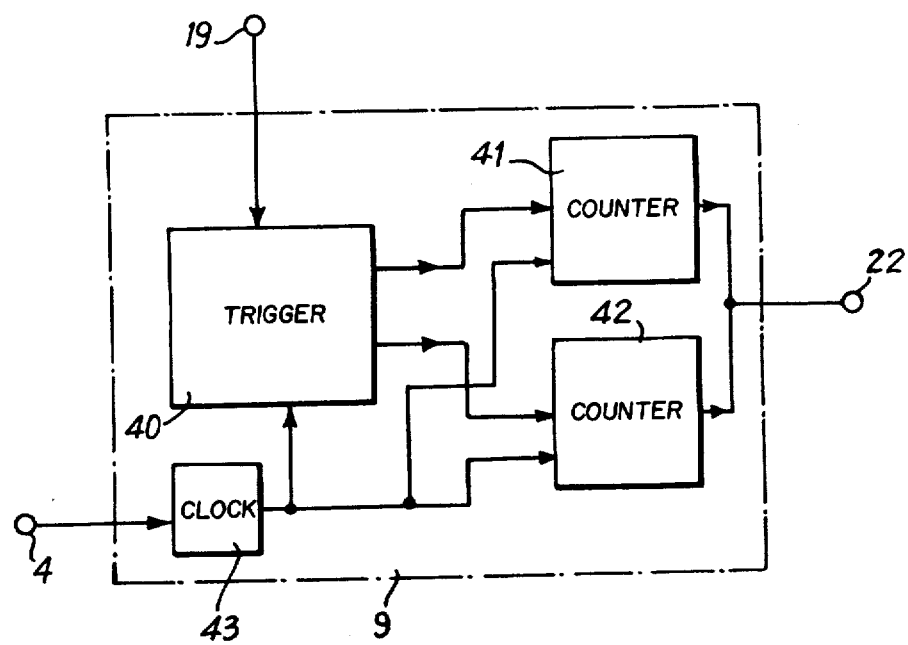

FIG. 4 schematically shows the structure of an embodiment of the generator of the primary and secondary reference pulse trains.

Referring now to the drawings, the device according to the invention, shown in FIG. 1, is intended to simulate the bearing signals of a TACAN beacon, with a view to testing and regulating the corresponding airborne equipment in an aircraft. In association with a DME beacon simulator (Distance Measuring Equipment) the device according to the invention may simulate such a beacon entirely.

As shown in FIG. 1, the device according to the invention comprises a quartz oscillator 1, intended to control its functioning. To this end, the oscillator 1 controls, by its output 2, the functioning of a clock 3, delivering for example a control frequency of 3600×135 Hz, allowing, as will be seen hereinafter, the digital synthesis of the sinusoidal signals at 135 Hz and 15 Hz for example by steps of 1/10th of degree. The clock 3 controls another clock (not shown) incorporated in the generator 6, and delivering a frequency 3600×15 Hz for the generation of the signal at 15 Hz. In its turn, the clock 3 controls, by its output 4, a digital generator 5 capable of synthesizing a sinusoidal signal at 135 Hz, a digital generator 6 capable of synthesizing a sinusoidal signal at 15 Hz, a phase converter 7 capable of simulating a beacon defect, a phase converter 8 capable of simulating an aircraft position with respect to the beacon, a digital generator 9 capable of simulating primary and secondary reference pulse trains and a bearing counter-displayer 10.

The generators 5 and 6, as well as the phase converter 7, are controlled by the clock 3 through a two-position switch 11, whilst the phase converter 8, the generator 9 and the counter-displayer 10 are controlled directly.

The digital generators 5 and 6 present a general structure of the type described hereinafter with reference to FIG. 2 and, as will be seen, they delivery voltage signals at their outputs 12 and 13. As to the phase converters 7 and 8 and to the counter-displayer 10, they are all of known type, with programmable counting value.

The outputs 12 and 13 of the generators 5 and 6 are connected to one of the inputs of an operational amplifier 14 mounted as a voltage/current converter, to make it possible to obtain at the output 15 of the latter, the modulation signal in current equivalent to the modulation signal TACAN. The other input 16 of the operational amplifier 14 is connected to ground.

The digital generator 5 comprises, moreover, an auxiliary output 17 on which appears a pulse during passage to the 0 degree phase of the sinusoid at 135 Hz produced by said generator 5. This auxiliary output 17 is connected to corresponding control inputs of the phase converter 7, the counter-displayer 10 and the phase converter 8. The connection between the auxiliary output 17 and this input for controlling the phase converter 8 is effected by means of one of the two positions of a switch 18.

The phase shifter 8 comprises, moreover, an auxiliary output 19 connected to corresponding control inputs of the digital generator 9 and the display counter 10, and by means of the other position of the switch 18, to the input of the phase converter 8 connected to the output 17 of the generator 5.

At the auxiliary output 19 of the phase converter 8 there appears, with a delay which may be chosen, the pulse of passage to 0 degree of phase of the sinusoidal signal at 135 Hz of the generator 5, said pulse entering in said phase converter 8, through the switch 18. The delay given to this pulse is effected digitally, due to the fact that the phase converter 8 is a digital counter, the counting value of which may be programmed. The clock 3 used for this counting is the same as that used for producing the sinusoidal signals of the generators 5 and 6. It allows programmable delays, for example in 1/10th of degree. The pulse thus delayed is used for synchronising the generator of the reference pulse trains 9 and the counter-displayer 10.

The phase converter 7 is of identical design to phase converter 8. It is intended to deliver, by its output 20, the synchonisation pulse of the generator 6. This pulse is none other than the pulse of passage to 0 degree of phase of the signal of generator 5, delayed by a delay programmable by the phase converter 7, so as to phase shift the two sinusoidal signals at 15 Hz and 135 Hz with respect to each other and thus simulate a deformation of the lobes of the emission pattern of the antenna of a TACAN beacon.

Thus, the delayed pulse appearing at the output 20 of the phase converter 7 has for its effect to initiate, with a possible delay, the sinusoidal signal at 15 Hz with respect to the 0 degree phase of the sinusoidal signal at 135 Hz.

It is thus easily imagined that, when the switches 11 and 18 occupy the positions in solid lines shown in FIG. 1, the fixed clock 3 controls the functioning of the device of the invention according to a mode which may be qualified as static (the aircraft being assumed to be immobile with respect to the simulator), so that:

the digital generator 5 furnishes at its output 12 the sinusoidal voltage signal at 135 Hz of the TACAN system;

the digital generator 6 furnishes at its output 13 the sinusoidal voltage signal at 15 Hz of the TACAN system, possibly delayed with respect to the signal at 135 Hz to simulate a deformation of the lobes of the emission pattern of the antenna of the TACAN beacon;

the phase converter 8, further to the delay which it brings to the signal of passage through 0 degree of phase of the signal at 135 Hz, simulates the bearing of an aircraft with respect to the simulated beacon. Consequently, the signal appearing at its output 19 is representative of this bearing;

the counter-displayer 10, which receives both the signal of passage through 0 degree of phase of the signal at 135 Hz coming from the output 17 of the digital generator 5 and the same signal delayed by the phase converter 8 and coming from the output 19 of this latter, compares these two signals and digitally displays on its output 21 the simulated bearing;

the generator 9, synchronised by the signal of the output 19, is capable of producing on its output 22 the primary and secondary pulse trains of the TACAN signal.

In this way, the simulation of a fixed TACAN bearing is obtained in entirely digital fashion. When it is desired to simulate a bearing variable in time with a certain speed, for example to take into account the speed of an aircraft with respect to the TACAN beacon, the switches 11 and 18 are changed so that they take the positions in dotted lines in FIG. 1.

Thus, due to the changing of the switch 11, the generators 5 and 6 and the phase converter 7 are no longer controlled by the fixed clock 3, but on the contrary by a variable clock 23, itself controlled by the output 24 of a variable oscillator 25. This oscillator 25, controlled by the output 26 of the quartz oscillator 1, comprises inputs 27 on which it is possible to introduce frequency signals, for example programmed, capable of influencing the fixed signal of the oscillator 1 to introduce thereon disturbances simulating different speeds of the aircraft with respect to the beacon. The generation of the sinusoidal signals at 15 Hz and 135 Hz is therefore controlled by a variable frequency.

Moreover, due to the changing of the switch 18, the synchronisation of the phase converter 8, by the sinusoidal signal at 135 Hz coming from the output 17 of the generator 5 is eliminated. Consequently, the phase converter 8 of which the output is looped to the input by the switch 18, always controls the generator 9, which continues to emit the primary and secondary reference signals of the TACAN system, now without synchronisation by the signal of the generator 5. These primary and secondary reference signals therefore continue to be emitted at fixed intervals of time, whilst the phase of the signals at 15 Hz and 135 Hz of the generators 5 and 6 with respect to these reference signals varies at a speed depending on the difference between the frequencies of the fixed quartz oscillator 1 and the variable oscillator 25.

During functioning of the TACAN simulator according to the invention in static mode, i.e. without simulation of speed, the variable clock 23 can be used for controlling the simulator in place of the stationary clock 3. Thus, a TACAN beacon could be simulated of which the frequency references would be mistuned.

FIG. 2 illustrates an advantageous embodiment according to the present invention, for the generators 5 and 6 shown in FIG. 1. This embodiment enables an electric, particularly sinusoidal signal to be obtained, of which the frequency, amplitude, phase and shape are obtained simultaneously by digital synthesis. Among the desirable features of this embodiment are that it is perfectly aperiodic and that the characteristics of the signal which it delivers depend only on those of a clock signal of frequency N times higher, N being the number of points used for synthesizing said signal.

The digital sinusoid generator 30 shown in FIG. 2 comprises a first forward-backward counter 31, connected to a memory 32 containing in coded form the function to be synthesized and to a control logic 33, as well as a second forward-backward counter 34 of totalization, receiving information from the memory 32 and the control logic 33. The first forward-backward counter 31 receives the signal from a clock 35, whilst the second forward-backward counter 34 controls a digital/analog converter 36, for example a multiplier. In FIG. 2, the clock 35 corresponds to the clocks 3 or 23 of FIG. 1.

The clock 35 is adapted to deliver a signal of frequency N.f, f being the frequency of the desired signal and N the number of points used for synthesizing this signal. If said latter is periodic and the synthesis is effected every 1/10th of degree, N takes the value 3600.

In this case of a periodic function, such as a sinusoidal function, due to the control logic 33, the forward-backward counter 31 is made to function so that it firstly effects the counting of N/4 clock pulses, then the count down of the following N/4 clock pulses, again the forward counting of the following N/4 clock pulses, and so on. On the other hand, still under the orders of the logic 33, the forward-backward counter totalizer 34 is controlled to count what it receives from the memory 32 during a period corresponding to the first N/4 clock pulses, then to count down for a period corresponding to the following 2.N/4 clock pulses, and again count forward for a period corresponding to the following N/4 clock pulses, etc.

To each state of the forward-backward counter 31 there corresponds a bit contained in the memory 32. This bit is either a logic 1 or a 0 and it indicates whether or not it is necessary to increment the output function of an increment i to follow as accurately as possible the function to be synthesized. In the case of this bit having the value 1, the forward-backward counter 34 of totalisation is incremented or decremented according to the order which it receives from the logic 33. The value of the increment i preferably corresponds to the logic 1 and this bit is then transmitted to the forward-backward counter 34 where it is added to or deducted from the total counted by said counter. In the case of the bit being 0, the state of the forward-backward counter 34 remains unchanged.

The state of the counter-totalizer 34 therefore represents the value of the function synthesized in digital form.

FIG. 3 illustrates the functioning of the generator when the logic 33 controls the two forward-backward counters 31 and 34 for forward counting, for the synthesization of a curve (C), the increment i having the value of a logic 1.

At the instant $t_0$ corresponding to the initial pulse of the clock 35, the curve (C) is zero. The memory 32 therefore contains, for the x-axis $t_0$, a logic 0 which is transmitted to the forward-backward counter 34. Said latter therefore registers 0.

At instant $t_1$, corresponding to the second pulse of the clock 35, the curve (C) presents a y-axis $C_1$, lower than the length of the increment i, but close thereto. Consequently, the memory 32 contains, for the x-axis $t_1$, a logic 1 which is transmitted to the forward-backward counter 34 and which is added to the preceding 0 registered. The output of the forward-back counter 34 indicates therefore the number 1 represented on FIG. 3 by level $N_1$.

Similarly, at instant $t_2$, corresponding to the third pulse of the clock 35, the curve (C) presents a y-axis $C_2$, lower than the length of the increment i, but close thereto. The memory 32 contains, for the x-axis $t_2$, a logic 1 which is transmitted to the forward-backward counter 34 and which is added to the preceding 0 and 1 registered. The output of the forward-backward counter 34 therefore takes level $N_2$. At instant $t_3$, corresponding to the fourth pulse of the clock 35, the curve (C) presents a y-axis $C_3$, higher than the level $N_2$, but nearer this level than level $N_2$ increased by the increment i. Consequently, the memory 32 contains, for the x-axis $t_3$, a logic 0 which is transmitted to the forward-backward counter 34. The output thereof therefore remains at level $N_2$, and so on.

The state of the forward-backward counter 34 therefore gives a digital approximation in steps (E) of the function (C). This digital indication is converted into analog form by the converter 36, the output 37 of which furnishes the sin (2 $\pi$ft) function. In the case of the converter being of the multiplier type, it comprises an auxiliary input 38 for a voltage A, and the signal A.sin (2 $\pi$ft) is then obtained at the output 37.

FIG. 3 partially illustrates the first phase of the synthesization of a sinusoid when the forward-backward counters 31 and 34 are simultaneously counting forward.

In a second phase, after the forward-backward counter 31 has counted N/4 pulses of clocks 35, the forward-backward counters 31 and 34 pass to count down. Thus, the logic 0's and 1's contained in the memory 32 are now selected in the same manner as before, but to logic 1 corresponds a decrementation of the forward-backward counter 34, instead of an incrementation. The function produced by the forward-backward counter 34 is therefore symmetrical to that produced during the first phase. If, during this first phase, a sinusoidal function is produced for an angle varying from 0 to $\pi/2$, during the second phase, the same sinusoidal function for the interval $\pi/2$ to $\pi$ will be produced.

In the third phase, the forward-backward counter 31 passes back to forward counting as in the first phase, whilst the forward-backward counter 34 remains in backward counting. The output function obtained will therefore be that of the first phase, but of inverse sign. Consequentely, in the example of sinusoidal function chosen hereinabove, the third phase corresponds to the interval $\pi$, $3\pi/2$.

In the fourth phase, the forward-backward counters 31 and 34 are respectively in backward counting and in forward counting. The sinusoid is therefore produced in the interval $3\pi/2$, $2\pi$.

At the end of this fourth phase, the forward-backward counter 34 is reinitialised and the cycle begins again at the first phase. Thus, the memory 32 may have only a capacity of N/4 bits for synthesizing a sinusoid with N points per period.

It will be noted that the stability of precision of the output voltage are those of the output digital/analog converter 36 and that the phase error of the synthesization is virtually that of said converter 36.

As mentioned hereinabove, it is advantageous to synthesize the sinusoidal signal every tenth of degree, i.e. to choose N=3600. The converter 26 may have a capacity of 10 bits and be bipolar, i.e. its output voltage may vary from $-V$ to $+V$. The value $-V$ corresponds to a digital word having all its bits at 0 and the value $+V$ to a word having all its bits at 1. The value 0 volt of the voltage V corresponds to the value 1 for the bit of highest weight, the other bits being at 0.

FIG. 4 illustrates the structure of the generator 9 of the primary and secondary reference pulse trains simulating those of a TACAN beacon. This generator 9 comprises a trigger 40 charged with elaborating pulses triggering the primary and secondary reference trains and synchronised by the pulse, described hereinabove, coming from the bearing phase converter 8. The generator 9 comprises, moreover, two counters 41 and 42 for generating primary and secondary reference trains receiving respectively the corresponding triggering pulses from the trigger 40. The outputs of the counters 41 and 42 are connected to form the output 22 of the generator 9. The trigger 40 and the counters 41 and 42 are controlled by a clock 43, receiving the signal from the fixed clock 3. The counters 41 and 42 are identical. They pass to forward counting upon reception of the corresponding triggering pulse coming from the trigger 40 and they each emit a programmed number of reference pulses. They stop when the number of reference pulses of a train is emitted.

What we claim is:

1. A device for simulating bearing signals of the TACAN type, formed by a modulation signal carried by a high frequency signal and resulting from the superposition of two sinusoidal signals of different low frequencies, as well as by spaced apart pulse trains, synchronised, at emission, with said modulation signal and representative of a determined orientation, said device comprising:

a quartz oscillator controlling a first fixed clock which controls in parallel:

a first digital generator adapted to product the equivalent of the sinusoidal signal of highest frequency, a second digital generator adapted to produce the equivalent of the sinusoidal signal of lowest frequency, a first digital counter with programmable counting value, a digital counter-displayer and a third digital generator adapted to produce the eqivalents of said reference pulse trains, said first generator being adapted to deliver to said second generator, to said first counter and to said counter-displayer a pulse representative of the passage to 0 degree of phase of the sinusoidal signal of highest frequency, whilst said first digital counter is adapted to transmit to the counter-displayer and to the third generator said representative pulse with a delay corresponding to a programmed counting value.

2. A device according to claim 1, wherein the first and second digital generators comprise at their output a digital/analog converter multiplier.

3. A device according to either one of claims 1 or 2, wherein, between the first and the second sinusoidal signal generators is disposed a second digital counter with programmable counting value adapted to transmit with delay said representative pulse to said second generator, said second counter being controlled by said clock.

4. A device according to claim 3, adapted to simulate the effect of the speed of a mobile body with respect to a TACAN beacon, wherein said quartz oscillator controls a second variable clock disposed in parallel on said fixed clock and is adapted to control, via a first position of a first two-position switching member having a second position which connects said fixed clock to said first digital generator, said second digital generator and said second digital counter, whilst a second switching member is provided having a first position connecting said first generator and said first counter and a second position looping said first counter on itself.

5. A device according to claim 1, in which at least one of said first and second digital generators is adapted to produce a sinusoidal signal of frequency f, by means of the synthesis of N points per period, said digital generator comprising a first forward-backward counter receiving from a clock a signal of frequency at least approximately equal to N.f and trasnmitting its state to a memory in which to each of these states there corresponds a logic level 1 or 0 according to whether it is necessary to increase the preceding totalised value to follow most accurately the function to be synthesized, a second forward-backward counter totalizer receiving this logic level 1 or 0 and a logic controlling said first and second forward-backward counters for forward counting or backward counting.

6. A device according to claim 1, wherein the third digital generator comprises a trigger and two generation counters, said trigger receiving its orders from the first digital counter with programmable counting value and controlling respectively said generation counters so that they each emit reference pulse trains respectively representative of the primary and secondary reference pulse trains of the TACAN system.

7. A device according to claim 1, in which the digital-/analog converters supply voltage signals, wherein the outputs of said first and second generators are connected to the same input of an operational amplifier mounted as a voltage/current converter.

* * * * *